(12) United States Patent
Chang et al.

(10) Patent No.: US 7,679,601 B2
(45) Date of Patent: *Mar. 16, 2010

(54) INPUT MEANS FOR INTERACTIVE DEVICES

(75) Inventors: Shyang-Jye Chang, Xindian (TW);
Ming-Jye Tsai, Xinpu Town (TW);
Chi-Liang Chen, Fengshan (TW);
Shun-Nan Liou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 804 days.

This patent is subject to a terminal disclaimer.

(21) Appl. No.: 11/432,630

(22) Filed: May 12, 2006

(65) Prior Publication Data

US 2007/0130582 A1 Jun. 7, 2007

(30) Foreign Application Priority Data

Dec. 1, 2005 (TW) .............................. 94142297 A

(51) Int. Cl.
*G09G 5/00* (2006.01)
(52) U.S. Cl. .......................... 345/156; 345/169; 463/49
(58) Field of Classification Search ...... 73/489–514.04; 345/156, 157, 158, 169; 463/37, 49
See application file for complete search history.

(56) References Cited

U.S. PATENT DOCUMENTS

| 4,787,051 | A | * | 11/1988 | Olson .......................... 345/179 |
| 5,181,181 | A | * | 1/1993 | Glynn ......................... 702/141 |
| 5,506,605 | A | * | 4/1996 | Paley .......................... 345/163 |
| 5,703,623 | A | * | 12/1997 | Hall et al. .................... 345/158 |
| 5,734,371 | A | * | 3/1998 | Kaplan ........................ 345/158 |
| 5,898,421 | A |   | 4/1999 | Quinn ......................... 345/156 |
| 5,926,168 | A |   | 7/1999 | Fan ............................. 345/158 |
| 6,545,661 | B1 |   | 4/2003 | Goschy et al. ............... 345/158 |
| 6,603,420 | B1 | * | 8/2003 | Lu ............................... 341/176 |
| 2002/0063689 | A1 | * | 5/2002 | Rogers ........................ 345/168 |
| 2002/0093483 | A1 | * | 7/2002 | Kaplan ........................ 345/158 |
| 2002/0099475 | A1 | * | 7/2002 | Spangler et al. ............. 700/280 |
| 2004/0095311 | A1 |   | 5/2004 | Tarlton et al. ................ 345/156 |
| 2004/0095317 | A1 | * | 5/2004 | Zhang et al. ................. 345/158 |
| 2005/0174324 | A1 | * | 8/2005 | Liberty et al. ................ 345/156 |

(Continued)

FOREIGN PATENT DOCUMENTS

TW 489275 7/1990

(Continued)

*Primary Examiner*—Amare Mengistu
*Assistant Examiner*—Koosha Sharifi
(74) *Attorney, Agent, or Firm*—WPAT., P. C.; Justin King

(57) ABSTRACT

An input means adapted for an interactive device is disclosed, which comprises: an inertial sensing module, for detecting a gesture movement of a user and thus generating a gesture signal accordingly; a multifunctional keypad, having at least a key to be selected and pressed for generating a selecting signal accordingly; a control unit, for fetching the selecting signal and the gesture signal and thus generating a control signal corresponding thereto; a signal processing unit, for receiving and processing the control signal so as to generate an interactive signal and then sending the interactive signal to the control unit; and a wireless transmission module, being used to transmit the interactive signal of the control unit to the interactive device.

14 Claims, 2 Drawing Sheets

U.S. PATENT DOCUMENTS

| | | | |
|---|---|---|---|
| 2005/0253806 A1* | 11/2005 | Liberty et al. ................ | 345/156 |
| 2006/0092133 A1* | 5/2006 | Touma et al. ................ | 345/158 |
| 2007/0050597 A1* | 3/2007 | Ikeda ............................ | 712/1 |

FOREIGN PATENT DOCUMENTS

| | | |
|---|---|---|
| TW | 577605 | 4/1992 |
| TW | 199624 | 2/1993 |
| TW | 538640 | 6/2003 |
| WO | WO 2005/040991 | 5/2005 |
| WO | WO 2005/103863 | 11/2005 |

* cited by examiner

INPUT MEANS FOR INTERACTIVE DEVICES

FIELD OF THE INVENTION

The present invention relates to an input means for interactive devices, and more particularly, to an integrated input means with sensing, controlling and wireless transmitting abilities, that is compact, good-looking and easy-to-use.

BACKGROUND OF THE INVENTION

The concept of interactive TV has been brought out as early as the establishment of cable TV. However, back then, the technology is not sophisticated enough to support the interactive TV to be commercialized. Following the advance of technology, the infrastructure for interactive TV distribution is complete that enables the broadcasting industry to experiment interactive TV in many major cities of the world. Traditional television is a one-to-many broadcast medium with passive viewers that is going to be overturned by the interactive TV which allows the viewer to interact with the television set in ways other than simply controlling the channel and the volume and handling videotapes.

The differences between the interactive TV and traditional television are listed as following:
(1) viewer participation: the interactive TV enables a viewer to comment a program while watching it and seeing the comment to be broadcasted in real time. For instance, a viewer of a ball game can vote to predict "which team is going to score next" and acknowledge to voting result instantly on the TV screen.
(2) personalized programming: the interactive TV provides a service of Video-on-demand enabling a viewer to watch any movie or program at any time convenient to him/her, by which the viewer can request a video and have it sent specifically to him/her, with VCR-like capabilities to pause, stop, rewind and fast-forward at any time, and furthermore, the viewer can save the selected videos on a central video server and play them at leisure by the playing order preferred thereby.
(3) information retrieval: a viewer can get information on everything he/she wants using interactive TV, for instance, a viewer can inquire local weather at any time, and further, the service allows quick tracking of stocks and sports teams that are of interest to the viewer, by providing customized details on stocks and teams of choosing.
(4) distance learning: interactive TV makes it possible for the whole family to educate themselves on all sorts of topics, in their own living room, at their own pace and in private. For instance, children can learn to read, see what Saturn looks like, and they will be able to see all the other students and the teacher at any moment in time in live transmissions but can learn whenever they preferred, and much more.
(5) home shopping: merchandises cataloged in an interactive TV system enable a viewer to order articles—ranging from supermarket items to clothes, and schedule to have them developed the following day, ordering it by pushing a single button on one's remote control, while sitting in your chair watching TV.

By now it is realized that interactive TV is similar to PCs in certain aspects—both offer interactive services. It is uncertain if PCs can offer hundreds of entertainment channels like interactive TV, but PCs have processors which are more advanced than those in interactive TV, allowing it to create and run programs such as word processors, databases, spreadsheets and other application programs. Therefore, the combination of computers and digital TVs should be the trend of future development. However, the combination of computers and digital TVs also requires a combination of the two different kinds of user interface used on these two kinds of machines. Computers use keyboards and mice as input devices, but TVs use remote controls as input devices. An interactive TV requires an input device which is good both for a computer and for a TV. Thus, a good input device for interactive TV is a compact, artistic, and easy-to-use input device integrating remote control capability and the capability of manipulating a cursor position.

There are already some prior-art devices capable of being used as the input device of interactive TV. One of which is a multi-functional remote control disclosed in TW Appl. No. 81211827. The referring patent provides a easy-to-use and good-looking multi-functional remote control integrating the remote control capabilities of most common household electronic appliances, such as television, video recorder, air conditioner, fan, etc., that can be used for replacing the plural remote controls of such appliances.

Another prior-art input device is disclosed in TW Pat. No. 00538640, which is a handheld device with integrated functions of remote control and information accessing. In a preferred embodiment of the referring patent, the patented device is embedded in a handheld apparatus, such as cellular phone, PDA, and e-book, etc., for enabling the same to function as an interactive TV.

Moreover, a method for moving a displayed object on an interactive computer graphic display in response to one of pitch and yaw rotations of an input device is disclosed in U.S. Pat. No. 5,898,421, entitled "GYROSCOPIC POINTER AND METHOD", which utilizes a gyroscope to detect rotations of hands holding the input device while converting the detected angular velocity into cursor movements. However, the competitiveness of the referring device is impaired by the expensive gyroscope, and thus limited the popularity of interactive TV.

In addition, one more such device is disclosed in U.S. Pat. No. 5,926,168, entitled "REMOTE POINTERS FOR INTERACTIVE TELEVISIONS", which can remotely direct a cursor to move in a way similar to that of a light-gun. However, the movements of the cursor controlled by a light-gun appear to be an intermittent movement of single dot jumping around a television screen, that the intermittent movement is not applicable to most common applications, but only to shooting games. Therefore, the referring device has poor marketing potential, and thus limits the interactive TV to a specific small user group.

All the above mentioned input devices can perform the basic functions of an interactive TV, such as moving a cursor and clicking on an icon or manual. However, all these devices have one common disadvantage: the cursor position can not be controlled intuitively, comfortably or conveniently by the standard of average home users. It is therefore imperative to invent a new and better input device that provide the comfort and convenience.

SUMMARY OF THE INVENTION

In view of the disadvantages of prior art, the primary object of the present invention is to provide an integrated input means with sensing, controlling and wireless transmitting abilities, adapted to be applied to an interactive device, that is compact, good-looking and easy-to-use.

It is another object of the present invention to provide an input means for interactive devices, which utilizes an inertial sensing module to detect a user's gesture for controlling the cursor position on a display directly and rapidly.

Yet, another object of the present invention is to provide an input means for an interactive device, by which a user can easily and intuitively control the cursor position on a display while enabling the user to interact intuitively with characters displayed on the display of the interactive device, by using a few buttons and simple action like "point and click".

Further, another object of the present invention is to provide an integrated input means to replace the mouse and keyboard as the input device for an interactive device, which has the remote cursor manipulating functions like a mouse and the text input functions like a keyboard.

One further object of the present invention is to provide an input means for an interactive device, which can be adapted to various displays applicable to the interactive device.

To achieve the above objects, the present invention provides an input means for an interactive device, which comprises:

- an inertial sensing module, for detecting a gesture of a user and thus generating a gesture signal accordingly;
- a keypad, having at least a key to be selected and pressed for generating a selecting signal accordingly;
- a control unit, capable of fetching the selecting signal and the gesture signal to generate a control signal corresponding thereto;
- a signal processing unit, for receiving and processing the control signal transmitted from the control unit so as to generate an interactive signal encoded for the interactive device and then sending the interactive signal back to the control unit; and
- a wireless transmission module, being used to transmit the interactive signal from the control unit to the interactive device.

Preferably, the control unit and the signal processing unit can be integrated into a chip.

Preferably, the inertial sensing module further comprises an accelerometer for detecting rotation of the input means.

Preferably, the accelerometer, capable of executing a difference method to compute angular accelerations while integrating the same to obtain angular velocities, is used to detect the gesture of the user.

Preferably, the signal processing unit is capable of converting and encoding the control signal into the interactive signal encoded for the interactive device by a means of difference/integration while transmitting the interactive signal back to the control unit.

Preferably, the interactive signal encoded for the interactive device is a coordinate signal representing a position of a display of the interactive device.

Preferably, the interactive signal encoded for the interactive device is a signal triggering a manual/icon selection of interactive device.

Preferably, the input means further comprises a casing for the keypad to be fitted thereon while exposing the keypad outside the casing to be operable externally.

Preferably, the keypad can be a device comprising buttons, rollers and joysticks.

Preferably, the keypad can be a device integrating functions of a computer mouse, text-inputting press-keys of a cellular phone and a television remote control while operating cooperatively with software and circuit matching thereto.

Preferably, the interactive device can be an interactive TV, an interactive computer, an integrated system of television and computer, a gaming console or other interactive multimedia apparatuses.

Preferably, the display of the interactive device can be a computer display, a television screen or other image projecting apparatuses.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
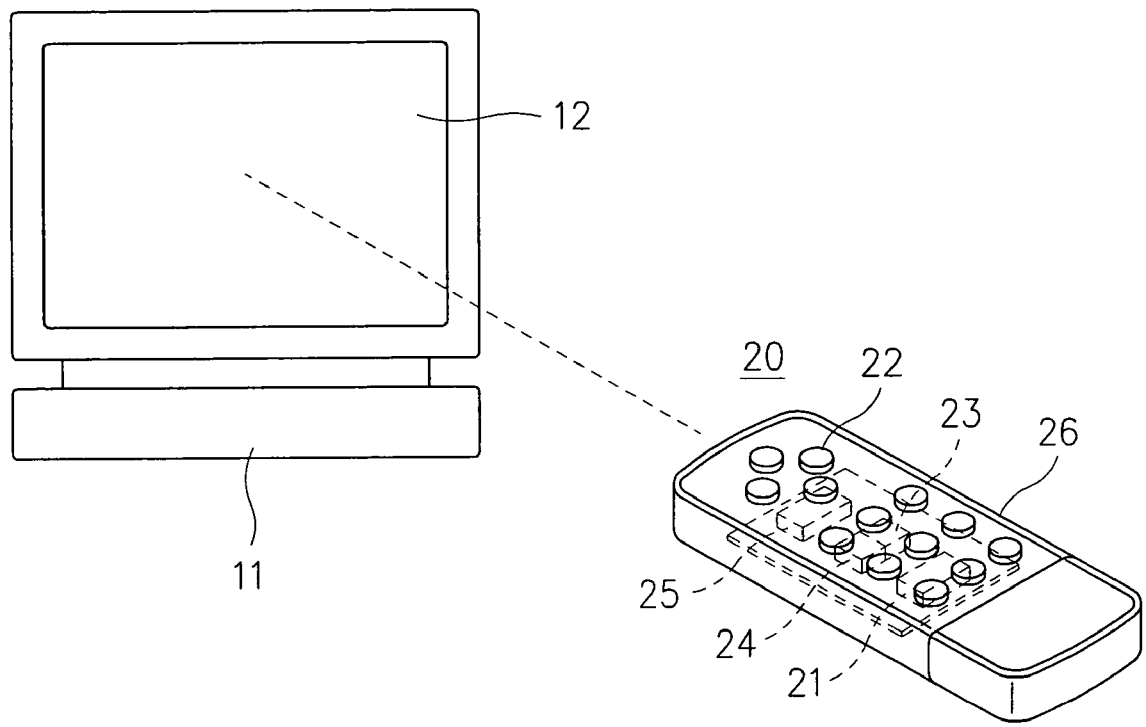
FIG. 1 is a schematic diagram depicting an input means for an interactive device according to a preferred embodiment of the invention.

Please refer to FIG. 1, which is a schematic diagram depicting an input means for an interactive device according to a preferred embodiment of the invention. The input means 20 is adapted for an interactive device 10 comprising a hub apparatus 11 and a displaying apparatus, whereas the hub apparatus 11 can be an interactive TV, an interactive computer, integrated system of television and computer, gaming console or other interactive multimedia apparatuses, and the displaying apparatus 12 can be a computer display, a television screen or other image projecting apparatuses, such as a raster-scan display, a liquid crystal display or a projector.

Figure 2:
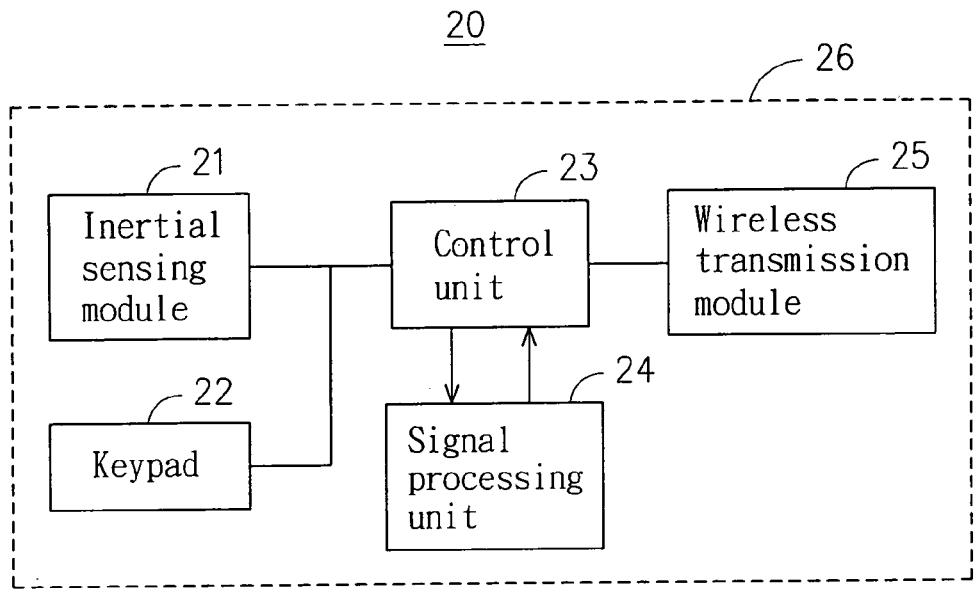
FIG. 2 is a block diagram of an input means for an interactive device according to the present invention.

As shown in FIG. 1 and FIG. 2, the input means 20 is comprised of an inertial sensing module 21, a keypad 22, a control unit 23, a signal processing unit 24 and a wireless transmission module 25, which are all being configured in a casing similar to a conventional remote control. Wherein, the inertial sensing module 21 is used for detecting a gesture movement of a user and thus generating a gesture signal accordingly; the keypad 22, having at least a key to be selected and pressed, is used for generating a selecting signal accordingly; the control unit 23 is used for fetching the selecting signal of the keypad 22 and the gesture signal of the inertial sensing module 21 and thus generating a control signal corresponding thereto; the signal processing unit 24 is used for receiving and processing the control signal so as to generate an interactive signal and then sending the interactive signal to the control unit 23; and the wireless transmission module 25 is used to transmit the interactive signal of the control unit 23 to the interactive device 10 to be displayed on the displaying apparatus 12. It is noted that the control unit 23 and the signal processing unit 24 can be integrated into a chip so that the total volume of the two units can be reduced and thus enables the overall volume of the input means to be reduced. Operationally, the gesture signal detected by the inertial sensing module 21 and the selecting signal generated by the keypad 22 are send to control unit for enabling the same to generate a control signal accordingly, and then the control signal is sent to signal processing unit 24 by the control unit 23 to be converted and encoded into an interactive signal encoded for the interactive device 10 by a means of difference/integration while transmitting the interactive signal back to the control unit 23, and then the interactive signal which can be a coordinate signal representing a position of a display of the interactive device or a signal triggering a manual/icon selection of interactive device, is sent to the interactive device 10 by the wireless transmission module 25.

Figure 3:
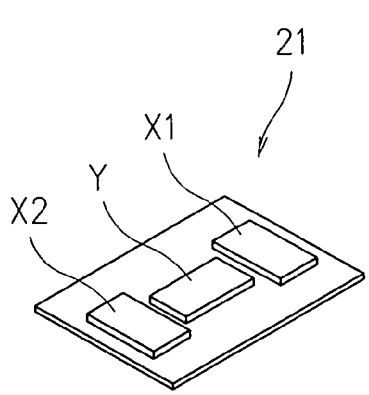
FIG. 3 is a schematic view of an inertial sensing module according to a preferred embodiment of the invention.
Figure 4:
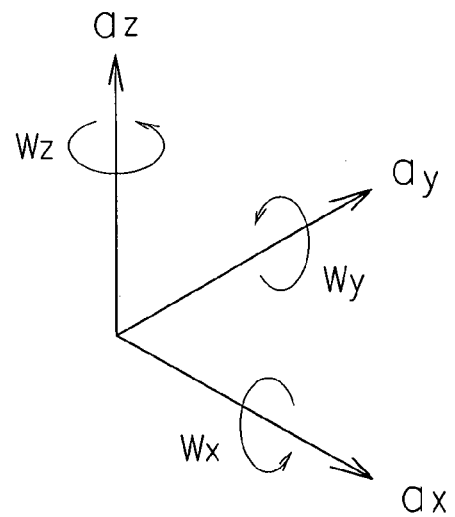
FIG. 4 is a 3-D Cartesian coordinates defining three angular velocities respectively for each coordinate, i.e. Wx, Wy, and Wz., for an inertial sensing module of the invention.

For enabling the inertial sensing module 21 to detect gestures of a user and as the gesture of the user operating the input means 20 can be represented as a three-dimensional movement defined by a 3-D Cartesian coordinates, i.e. X axis, Y axis and Z axis coordinates, as shown in FIG. 3 and FIG. 4, the inertial sensing module 21 is comprised of two X-axis accelerometers X1, X2 for detecting horizontal movements and a Y-axis accelerometer Y for detecting vertical movements. Thereby, the accelerations $a_{x1}$, $a_{x2}$ detected respectively by the two accelerometers X1, X2 are differentiated and then integrated to calculate and obtain an angular velocity Wz, and the accelerations $a_y$ detected respectively by the accelerometer Y are differentiated and then integrated to calculate and obtain an angular velocity Wx, as the accelerometer is used to detect the gesture of the user.

As the input means 20 of FIG. 1 is housed inside a casing 26 similar to a conventional remote control, the keypad 22 is fitted on the casing 26 while exposing the keypad 22 outside the casing 26 to be operable externally so as to accustom the input means 20 to the general using habits of interactive TV. However, since the interactive device 10 can be an interactive computer, an integrated system of television and computer, a gaming console or other interactive multimedia apparatuses, the functions and outlook of the keypad can be varied accordingly. For instance, the keypad 22 can be a device integrating functions of a computer mouse, text-inputting press-keys of a cellular phone and a television remote control while operating cooperatively with software and circuit matching thereto. In addition, the keypad 22 can be a device comprising buttons, rollers and joysticks, which is known to prior arts and thus is not described further herein.

From the above description, the present invention has advantages listed as following:

(1) The input means of the present invention is an integrated input means capable of replacing the mouse and keyboard as the input device for an interactive device, which has the remote cursor manipulating functions like a mouse and the text input functions like a keyboard that not only is convenient to usage, but also is a compact and artistic apparatus.

(2) The input means of the present invention is capable of not only enabling a user to control the movement of a cursor displayed on the screen of the interactive device intuitively, but also facilitating the user to interact with objects of the interactive device while the input means is integrated with press buttons.

(3) Since the input means of the present invention can be operated intuitively, a user can easily use the input means to interact with an interactive device, without learning.

(4) As the input means of the present invention is adapted to be applied by an interactive device, such as an interactive TV and by the acceleration detection and calculation algorithm of the input means, the characters displayed on the display of the interactive device is responding instantly to the gestures sand hand movements of the user as the user is holding the input means such that controllability provided by the input means is preferred.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. input means for an interactive device, comprising:
   a first accelerometer detecting a first linear movement along a first axis;
   a second accelerometer detecting a second linear movement along said first axis;
   a third accelerometer detecting a third linear movement along a second axis and a first rotational movement around said first axis
   a keypad, having a key to be selected and pressed for generating a selecting signal accordingly;
   a control unit, fetching the selecting signal, the first linear movement, said second linear movement, said third linear movement, and said first rotational movement, calculates a second rotational movement around a third axis based on said first linear movement and said second linear movement, and generating a control signal corresponding thereto;
   a signal processing unit, for receiving and processing the control signal transmitted from the control unit so as to generate an interactive signal encoded for the interactive device and then sending the interactive signal back to the control unit; and
   a wireless transmission module, being used to transmit the interactive signal from the control unit to the interactive device.

2. The input means of claim 1, wherein the interactive signal encoded for the interactive device is a coordinate signal representing a position of a display of the interactive device.

3. The input means of claim 1, wherein the interactive signal encoded for the interactive device is a signal triggering a manual/icon selection of interactive device.

4. The input means of claim 1, wherein the input means further comprises a casing for the keypad to be fitted thereon while exposing the keypad outside the casing to be operable externally.

5. The input means of claim 1, wherein the keypad comprises a press button.

6. The input means of claim 1, wherein the keypad is a device integrating functions of a computer mouse, text-inputting press-keys of a cellular phone and a television remote control while operating cooperatively with software and circuit matching thereto.

7. The input means of claim 1, wherein the interactive device is an interactive television.

8. The input means of claim 1, wherein the interactive device is an interactive computer.

9. The input means of claim 1, wherein the interactive device is an interactive integrated system of television and computer.

10. The input means of claim 1, wherein the interactive device is a gaming console.

11. The input means of claim 1, wherein the interactive device is an interactive multimedia apparatus.

12. The input means of claim 1, wherein a display of the interactive device is a computer display.

13. The input means of claim 1, wherein a display of the interactive device is a television screen.

14. The input means of claim 1, wherein a display of the interactive device is an image projecting apparatus.

* * * * *